Feb. 28, 1939.  E. RICHTER  2,148,504
COMBINATION STABILIZING, SNUBBING, AND LEVELING SYSTEM FOR VEHICLES
Filed Dec. 19, 1936   7 Sheets-Sheet 1

Inventor:
Edward Richter
By
Wilson, Dowell, McCanna & Wintercorn
Attys.

Feb. 28, 1939. E. RICHTER 2,148,504
COMBINATION STABILIZING, SNUBBING, AND LEVELING SYSTEM FOR VEHICLES
Filed Dec. 19, 1936 7 Sheets-Sheet 3

Inventor:
Edward Richter

Feb. 28, 1939.  E. RICHTER  2,148,504
COMBINATION STABILIZING, SNUBBING, AND LEVELING SYSTEM FOR VEHICLES
Filed Dec. 19, 1936  7 Sheets-Sheet 7

Inventor:
Edward Richter
By
Wilson, Dowell, McCanna & Wintercorn
Attys.

Patented Feb. 28, 1939

2,148,504

UNITED STATES PATENT OFFICE

2,148,504

COMBINATION STABILIZING, SNUBBING, AND LEVELING SYSTEM FOR VEHICLES

Edward Richter, Freeport, Ill.

Application December 19, 1936, Serial No. 116,729

20 Claims. (Cl. 296—16)

This invention relates to a combination stabilizing, snubbing, and leveling system for motor vehicles having the frame supported on springs carried on the axles or axle housings. While the invention is herein disclosed as applied to a side-service hearse for the automatic or semi-automatic leveling of the hearse body to insure proper disposition of the casket table in loading and unloading the casket, it must be understood that this is only one of many possible applications, the invention being applicable to taxicabs, ambulances and automobiles generally, trucks and busses, and, in fact, any vehicle having spring suspension.

The principal object of my invention is to provide a hydraulic spring control apparatus which can be operated interchangeably as a stabilizing means or simply as a snubbing or shock absorbing means, depending upon requirements in driving, and is further designed and adapted for use as a power operated positive leveling jacking means when the vehicle is at a standstill or about to be stopped, the hydraulic fluid being a positive action medium and supporting the vehicle rigidly in leveled position.

An important object is to provide a manually operable valve in connection with the hydraulic apparatus which can be set in either of two positions for power jacking operation to raise the right side and simultaneously depress the left side of the vehicle, or vice versa, the hydraulic fluid used providing substantially non-yielding links or ties between the body and axle to hold the body rigidly in adjusted position to the axle.

Another important object is to provide a manually operable control lever in connection with the control valve and the electric motor operated pump for delivering fluid under pressure to the working cylinders of the hydraulic apparatus, the said lever being arranged to move from one extreme position to another and to complete electrical circuits through the motor only in the extreme positions, one extreme position being for right-hand leveling and the other for left-hand leveling, and the intermediate positions in which the motor is not operable serving to set the control valve for snubbing or stabilizing, as desired.

Still another important object consists in the provision of a retrieving chamber communicating on the one hand with the working cylinders so as to drain all leakage therefrom, and communicating on the other hand with the sump of the electric pump which is a sealed chamber in which suction is created in the operation of the pump, whereby to draw fluid from the retrieving chamber and keep the total quantity of working fluid in the system substantially constant.

The invention embraces still other important objects and advantages which need not be enumerated at this point but which will be fully demerated hereinafter in the detailed description in which reference is made to the accompanying drawings, wherein—

Similar reference numerals are applied to corresponding parts throughout the views.

Figure 1:
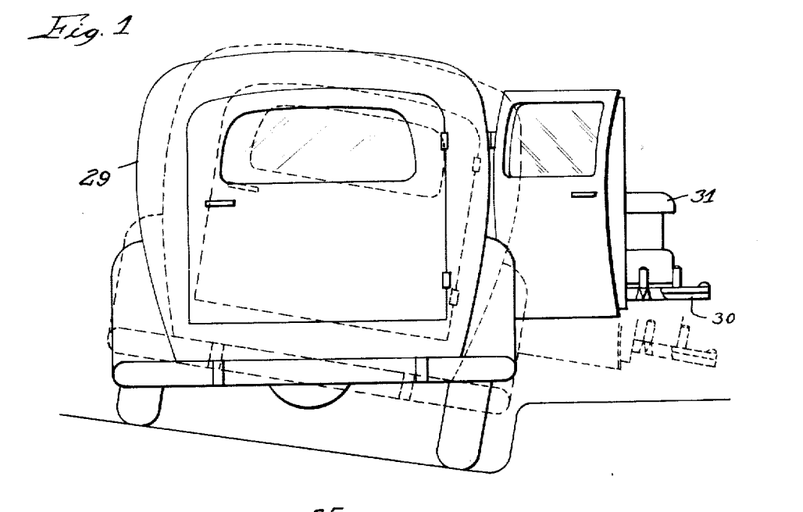
Fig. 1 is a rear view of a side-service hearse at a curb, illustrating in full lines how the body thereof has been leveled from the normal or dotted line position, in accordance with my invention.

Referring to Fig. 1, I have illustrated a side-service hearse standing at the curb on a street having about the usual crown. There is such sidewise inclination of the hearse body, due to the grading of the street from the crown to the curb, that unless the hearse is leveled, the casket table when extended from the side of the hearse comes too close to the sidewalk, and may even come in contact with it. The leveling means of my invention overcomes this objection by raising the hearse body 29 on the right side and depressing it on the left side relative to the rear axle housing so as to make it level and accordingly level the table 30 bearing the casket 31. Now, of course, such leveling is also desirable in other vehicles where, due to the height of the curb and the sidewise inclination of the car standing next to it, the door in opening is apt to strike the curb and be thereby marred, that is, if the curb does not prevent opening of the door entirely. Hence, the invention while herein shown applied to a side-service hearse, must not be regarded as limited to that specific application, because it is applicable to ambulances, taxicabs, and, in fact, most any vehicle having spring suspension and used under conditions where the above or some similar problem is presented. The large variety of vehicles to which the invention applies was previously enumerated. It should also be understood that while I have disclosed a hydraulic spring control apparatus in connection with the rear axle housing, a similar apparatus could be provided in connection with the front axle, interconnected hydraulically with the rear unit or operated independently but simultaneously therewith, as desired, although I have found that the leveling can be accomplished satisfactorily from the one end, especially if the frame is of sufficiently rigid construction, which is usually the case.

Figure 10:
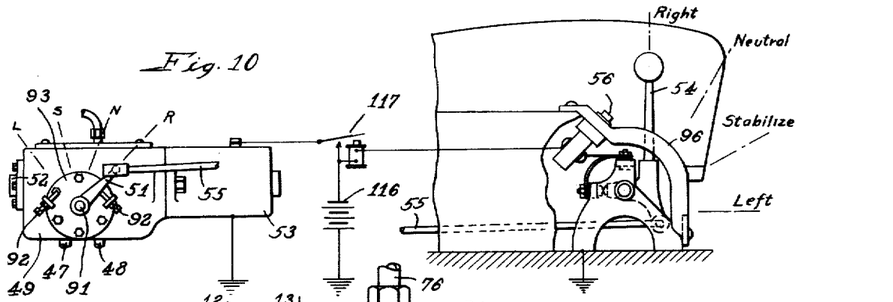
Fig. 10 is a diagrammatic view illustrating the mechanical and electrical connections between the hand control lever and the valve and motor of the pump unit.
Figure 11:
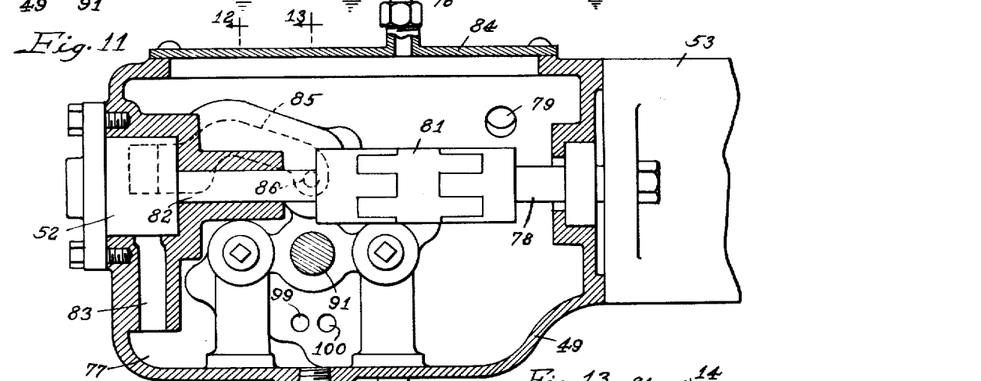
Fig. 11 is a longitudinal section through the pump unit on a larger scale.

Referring now mainly to Figs. 2 to 4, 32 designates the vehicle frame connected in the usual way to springs 33 secured to the rear axle housing 34. Two working cylinders 35 and 36 are mounted horizontally in the rear end of the frame and each contains a double-acting piston 37 (Fig. 5). These have lateral extensions 38 intermediate the ends thereof projecting through longitudinal slots 39 in the side walls of the cylinders for connection through rubber cushion plugs 40' with rods 40 pivotally connected at their remote ends to spring control levers 41 and 42. The latter are bell-crank levers pivotally mounted in hangers 43 attached to the frame 32. The other arms of these levers have ball-and-socket universal joint connections with rods 44 secured with the springs 33 to the rear axle housing 34, the connections to the latter also including rubber blocks 44' for cushioning and to provide flexibility, for the purposes hereinafter set forth. The crisscrossed pipes 45 and 46 connect the front end of cylinder 35 with the rear end of cylinder 36 and the front end of cylinder 36 with the rear end of cylinder 35. In addition to this, there are flexible conduits 47 and 48 extending from the front ends of the cylinders 35 and 36 to the pump unit 49 where a valve 50 (Fig. 13) operated by the lever 51 controls communication between the cylinders themselves for stabilizing and snubbing or shock absorbing, and controls communication between the cylinders and a pump 52 (Fig. 11) for right or left hand leveling. The pump 52 is arranged to be driven by an electric motor 53 whenever the electrical circuit therefor is completed. A hand control lever 54 situated conveniently for the driver to operate from the driver's seat, as, for example, between the two front seats, as shown in Fig. 6, is connected with the lever 51 by rod 55, as indicated in Fig. 10. This brief general description will enable one to understand the diagrams, Figs. 20 to 23, to which reference is now made for a description of the mode of operation of the apparatus of my invention.

*Right-hand leveling (Fig. 20)*

The hand lever 54 is in the vertical position labeled "Right" in Fig. 10, which signifies that the right side of the body is to be raised with respect to the axle housing simultaneously with the depression of the left side. In other words, viewing Fig. 2, lever 42 is to be turned in a counterclockwise direction by rearward movement of the piston in cylinder 36 while the lever 41 is to be turned in a clockwise direction by forward movement of the piston in cylinder 35. This is indicated by the small arrows adjacent the extensions 38 in Fig. 20. The motor 53, as hereinafter explained, is operable only with the lever 54 in either of its extreme positions, that is, either vertical for right-hand leveling or horizontal for left-hand leveling, as per captions in Fig. 10. A push button switch 56 is depressed by the operator to operate the motor 53 and pump 52 until the car is leveled. Now, as appears in Fig. 20, oil or other substantially incompressible hydraulic fluid from the pump 52 is delivered under pressure to the valve 50, and as indicated by the arrowed line, is delivered through conduit 48 to the front end of cylinder 36, whereby positively to force the piston 37 therein rearwardly and accordingly turn the lever 42 in a counterclockwise direction to raise the right side of the body. Fluid from the rear end of cylinder 36 is exhausted through pipe 45 into the front end of cylinder 35 from which point it is exhausted through flexible conduit 47 back to the valve 50. At the same time that the fluid is being delivered under pressure to the front end of cylinder 36 to move the piston therein rearwardly, fluid under pressure is delivered to the rear end of cylinder 35 through pipe 46 positively to move the piston therein forwardly, whereby to turn the lever 41 in a clockwise direction and accordingly depress the left side of the body. As the piston 37 in cylinder 35 moves forwardly, the fluid from the front end of the cylinder is exhausted through conduit 47 with the fluid exhausted from the rear end of cylinder 36. The body, in other words, is positively jacked into leveled position and held there; the vehicle springs are inoperative so far as allowing any relative movement between the body and axle is concerned, so long as the hydraulic jacking apparatus is in control of the body, as just described.

This leveling can be accomplished after the car has been stopped or it may be done just prior to or during stopping. An experienced driver handling the operation the latter way makes it unnoticeable. This is also true of the operation of allowing the body to resume its normal relation to the axle as the car leaves the curb.

A feature of this leveling apparatus especially important from the standpoint of its use on hearses is the fact that the hearse body is locked positively against any deflection relative to the axles, once the vehicle has been leveled. This is important, because if a compressible medium, such as air, were used, when the casket table is extended from the side of the hearse, the casket has considerable leverage on the outer end of the extended casket table and the weight of the casket would be sufficient to deflect the hearse body downwardly beyond the dotted line position shown in Fig. 1. In other words, air would give a sort of spring-board action. When the hearse body has been leveled as is shown in full lines in Fig. 1, the incompressible oil columns make the body independent of its spring suspension so far as any possibility of the hearse body deflecting under load on the outer end of the casket table is concerned. The substantially incompressible hydraulic fluid, in other words, acts as a rigid nonyielding link connection between the frame and axle on both sides of the vehicle, holding the body rigidly in leveled position.

*Left-hand leveling (Fig. 23)*

Figure 20:
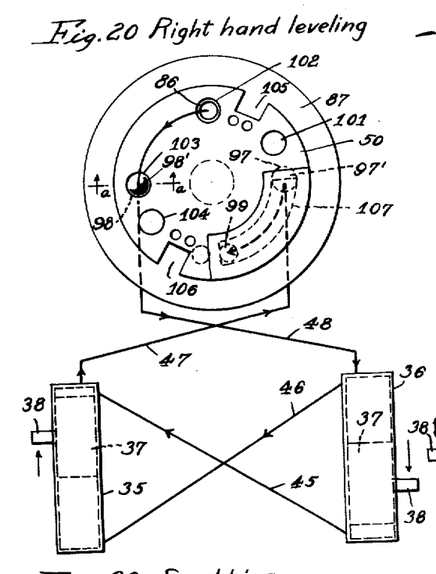
Figs. 20 to 23 are hydraulic circuit diagrams showing fluid flow between the control valve and the working cylinders obtained in the four different positions of the hand control lever.
Figure 23:
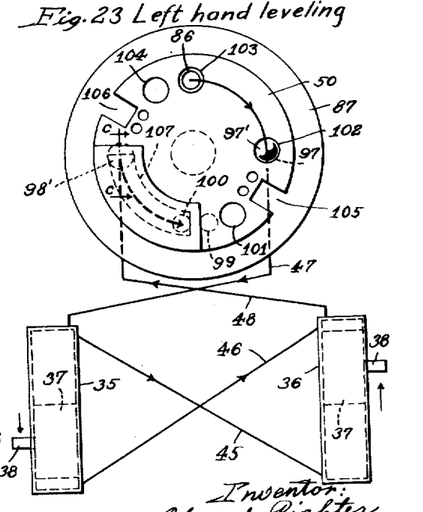

This operation is the reverse of that illustrated in Fig. 20, the piston 37 in cylinder 36 being caused to move forwardly so as to depress the right side of the car body while the piston in cylinder 35 is moved to the rear to raise the left side. This is indicated by the small arrows adjacent the extensions 38 on the pistons. The fluid under pressure delivered from the pump 52 is in this operation conducted through the conduit 47 to the front end of cylinder 35, while the fluid exhausted from the rear end of cylinder 35 and front end of cylinder 36 is conducted through conduit 48 back to the valve 50. The arrowed lines here again indicate the direction of flow of the fluid under pressure from the pump through the valve 50 to the cylinder 35 and the return of fluid from the cylinder 36 back to the valve 50.

*Stabilizing (Fig. 21)*

Figure 21:
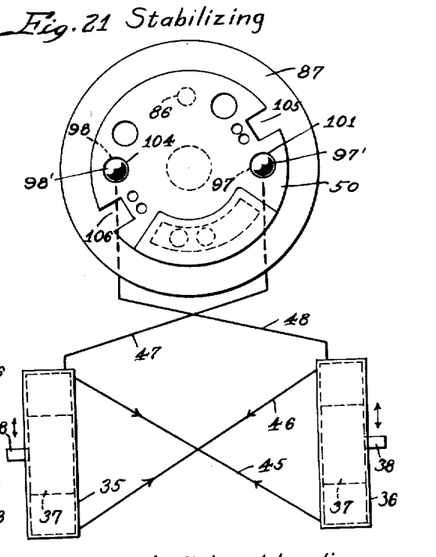

In the stabilizing operation, the valve 50 is closed off from fluid communication with either of the working cylinders 35 and 36. These cylinders, however, still communicate with one another through pipes 45 and 46, so that fluid set in motion in either cylinder as a result of movement of the piston therein caused by side sway of the car body, as, for example, in going around a curve or sharp turn, will result in an equal movement of the piston in the other cylinder, thus restraining the body and minimizing this objectionable body movement. It is seen that if, for example, the piston 37 in cylinder 35 starts to move forwardly, due to side sway of the body toward the left in making a right-hand turn or going around a curve to the right, this forward movement of the piston in cylinder 35 will produce an equal forward movement of the piston 37 in cylinder 36, because the fluid displaced from the front end of cylinder 35 is delivered to the rear end of cylinder 36. There is at the same time a fluid flow from the front end of cylinder 36 back to the rear end of cylinder 35 to compensate for this movement of the piston in cylinder 35. The small double-ended arrows adjacent the extensions 38 of the pistons indicate that the action described occurs with either piston starting to move in either direction. It is apparent therefore that the centrifugal force acting upon the body of a spring suspension vehicle cannot result in objectionable "rolling" of the vehicle body, because to whatever extent one side of the body is depressed, the other side of the body is depressed a corresponding degree, and in that way the car tends to "hug" the road and the likelihood of overturning or skidding is reduced considerably.

It will be clear that while this operation is called stabilizing, the spring control apparatus under this valve setting also functions as "stiff" action shock absorbers. The springs are stiffer because any fluid set in motion by one piston must cause a like movement of the other piston. Much of the actual cushioning in this case is derived from the plugs 44'.

*Snubbing or shock absorbing (Fig. 22)*

Figure 22:
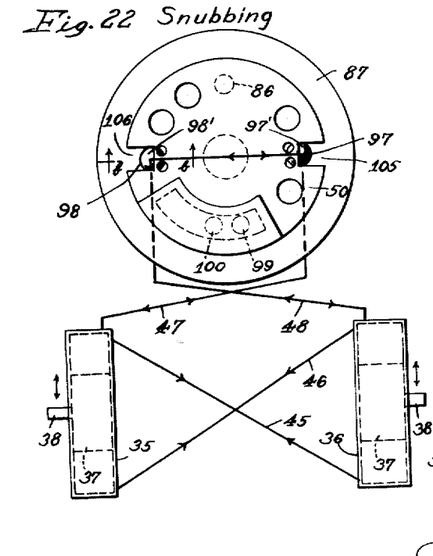

This position of the valve 50 corresponds to the "neutral" position of the hand lever 54 in Fig. 10. It is called the neutral position for the reason that the pump 52 plays no part in this operation like it does in the leveling operation previously described, nor does the valve 50 shut off fluid flow through the conduits 47 and 48 as it does in the stabilizing operation above described. The lines indicating the fluid flow through the valve 50 have arrows pointing in both directions, indicating that the flow can occur in either direction. The reason for this is that the pistons 37 in the cylinders 35 and 36 are substantially, though not entirely, independent of one another under these circumstances, either being movable separately in either direction, as indicated by the double-ended arrows adjacent the extensions 38. This gives "soft" riding springs. The only restraint upon movement of either piston is the frictional resistance or "skin friction" upon the flow of fluid through the pipes and conduits which in this position of the valve 50 serve to interconnect the opposite ends of each cylinder. Thus, for example, if it be assumed that the left rear wheel strikes a bump, causing the piston 37 to move forwardly in cylinder 35 in the flexing of the left spring 33, the shock is absorbed or dampened by the fluid set in motion in the system by the piston 37. The piston 37 in cylinder 35 in moving forwardly displaces fluid from the front end which flows through conduit 47 to the valve 50 and through the valve to conduit 48 and thence through the front end of cylinder 36 to pipe 46 back to the rear end of cylinder 35.

In the snubbing or shock absorbing operation just described, the apparatus serves to a smaller degree also as a stabilizer, because fluid set in motion by one piston tends to cause like movement of the other piston through the criss-cross connection between the cylinders.

Figure 3:
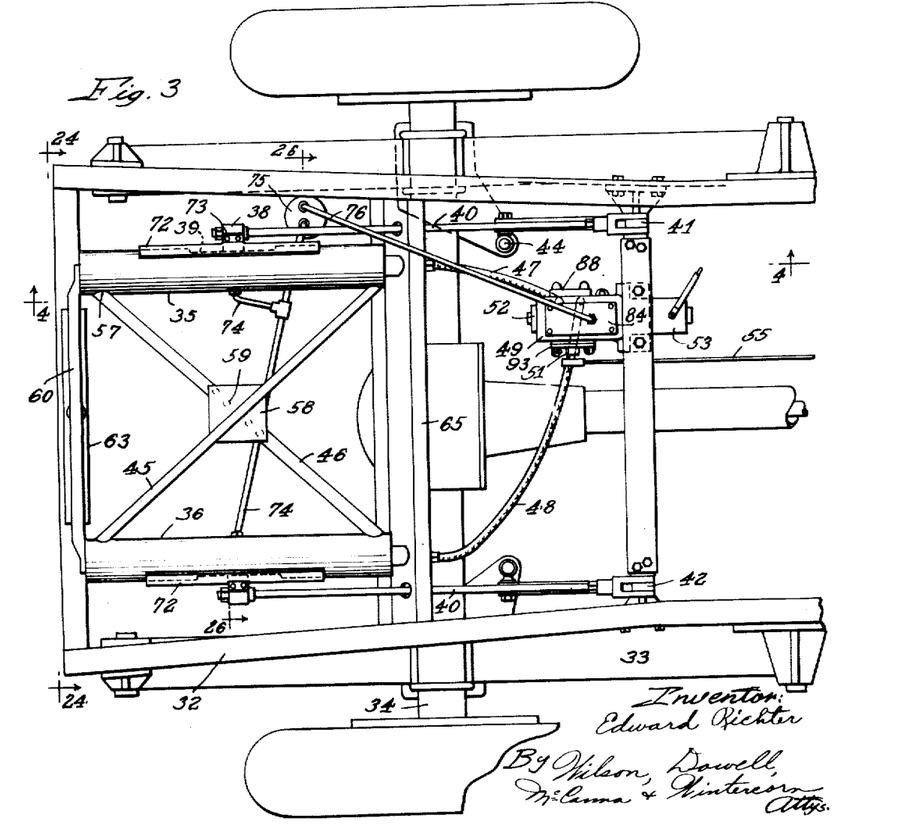
Fig. 3 is a plan view of the rear portion of a motor vehicle chassis showing a hydraulic spring control apparatus installed thereon, in accordance with my invention.
Figure 4:
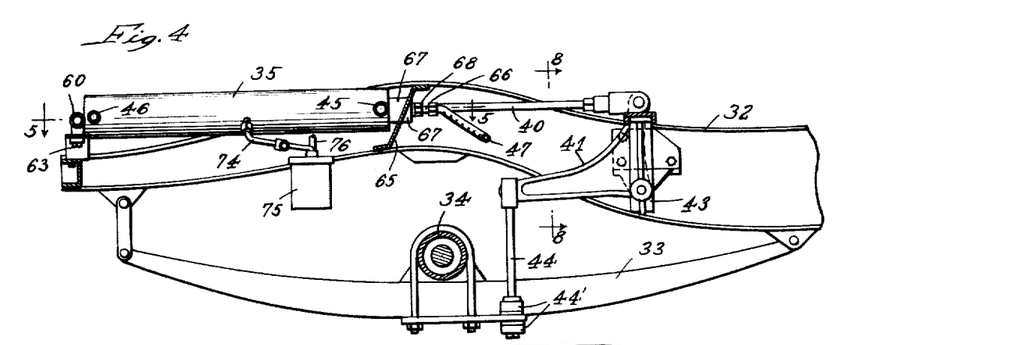
Fig. 4 is a longitudinal section taken on the line 4—4 of Fig. 3.
Figure 5:
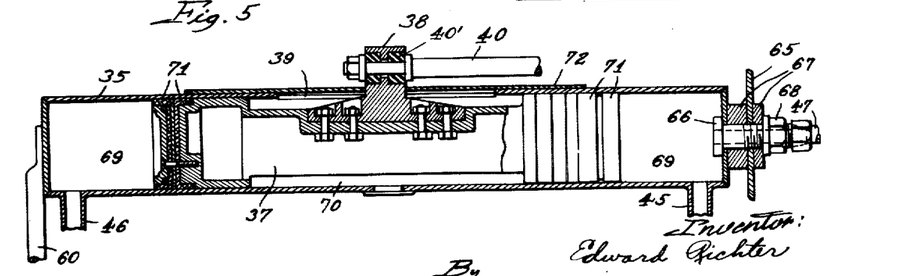
Fig. 5 is a horizontal section through the left working cylinder on an enlarged scale, taken on the line 5—5 of Fig. 4.
Figure 6:
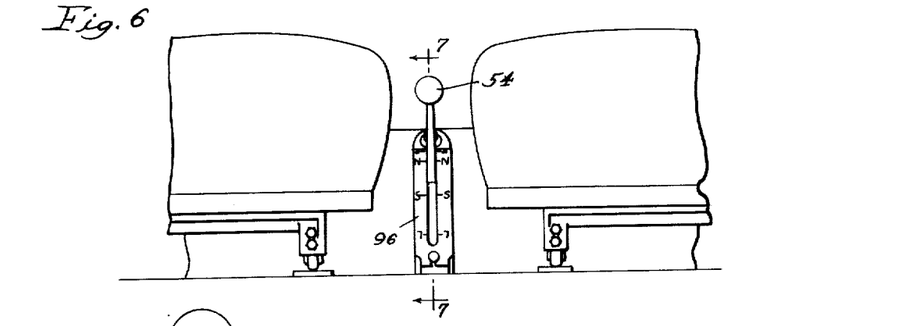
Fig. 6 is a view of the hand control lever and its index plate looking to the rear from the front of the driver's compartment toward the two seats between which the lever is mounted.
Figure 24:
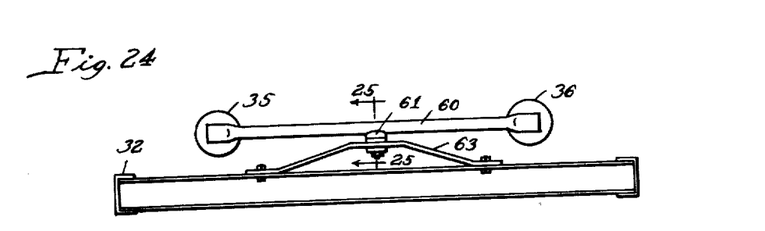
Fig. 24 is a rear view of the frame showing how the spring control apparatus is flexibly mounted thereon, this view being taken on the line 24—24 of Fig. 3.
Figure 25:
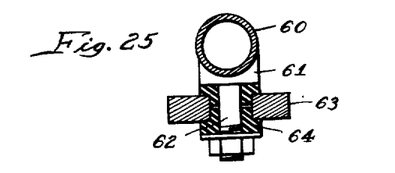
Fig. 25 is an enlarged sectional detail on the line 25—25 of Fig. 24.

Referring now mainly to Figs. 3, 4 and 5, and also Figs. 24 and 25, it will be seen that the pipes 45 and 46 are not only welded at their ends to the walls of the cylinders 35 and 36, as at 57, but have a plate 58 at the intersection point which is arranged to be welded, as at 59, to the top of the lower pipe 46 and similarly welded to the bottom of the other pipe 45, thereby forming a unitary rigid cylinder assembly with the interconnecting pipes. A cross-member 60, welded at its ends to the rear ends of the cylinders, reenforces the assembly and is used as a means of attachment to the vehicle frame 32, the same having a downward extension 61 at the middle thereof carrying a stud 62 for bolting the assembly to a bracket 63 secured to the rear cross-member of the frame. Rubber or other yielding cushioning means 64 interposed between the stud 62 and the bracket 63 affords "give" to allow for the slight amount of weave in the frame relative to the cylinder assembly. Whatever other "give" is necessary in the operation of the apparatus is provided for in the rubber connections at 40' and 44'. The assembly is fastened rigidly to an intermediate cross-member 65 on the frame at the front ends of the cylinders, the nipples 66 used as a means of connecting the conduits 47 and 48 to the cylinders being employed further as a means of fastening the assembly to the frame. Due to the inclination of the cross-member 65, wedge shaped washers 67 are fitted on the nipple 66 on opposite sides of the member 65 before the nut 68 and its washer are assembled on the nipple. It is manifest that an appreciable saving in cost is realized in providing the cylinders in a unitary assembly, as distinguished from mounting them separately in the vehicle frame, and, in addition, this unitary assembly makes it much easier to mount the apparatus in the frame or remove it therefrom, only three connections being necessary, two on the cross-member 65 and the other on the bracket 63.

Figure 2:
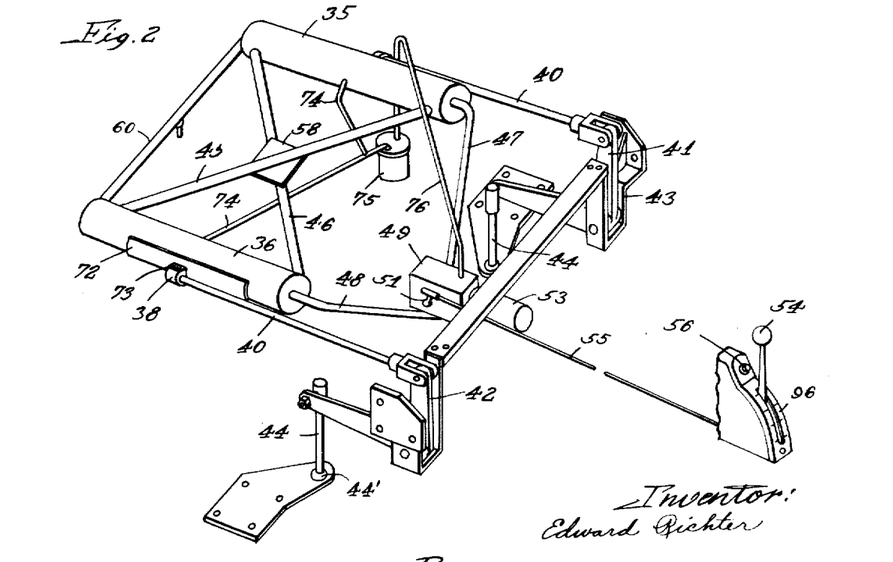
Fig. 2 is a perspective diagram of the spring control apparatus operative not only for the leveling illustrated in Fig. 1, but also for snubbing and stabilizing.
Figure 12:
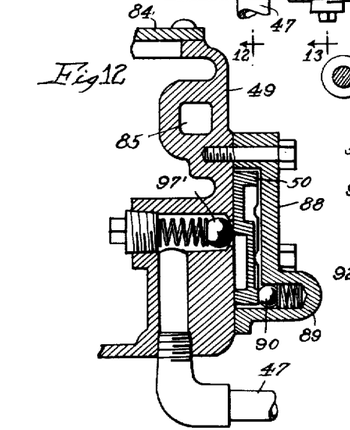
Figs. 12 and 13 are a sectional detail and cross-section, respectively, through the pump unit on the correspondingly numbered lines of Fig. 11.
Figure 14:
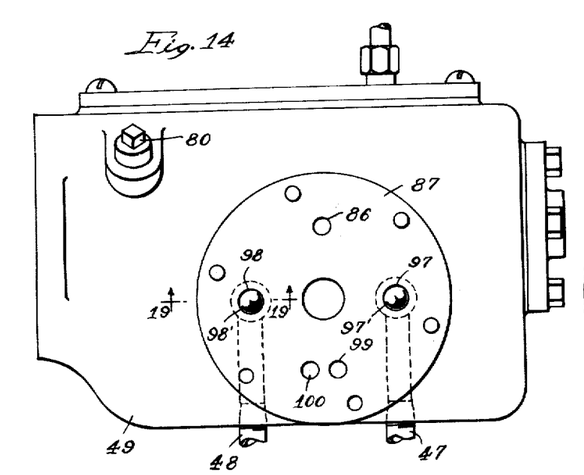
Fig. 14 is a side view of the pump unit taken on the line 14—14 of Fig. 13 to show the valve seat.
Figure 15:
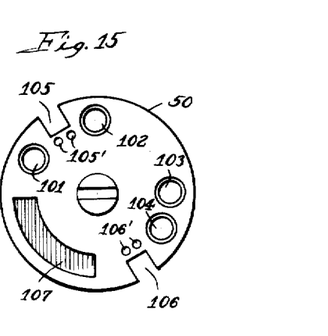
Figs. 15 and 16 are two views of the rotary valve taken on the correspondingly numbered lines of Fig. 13.
Figure 26:
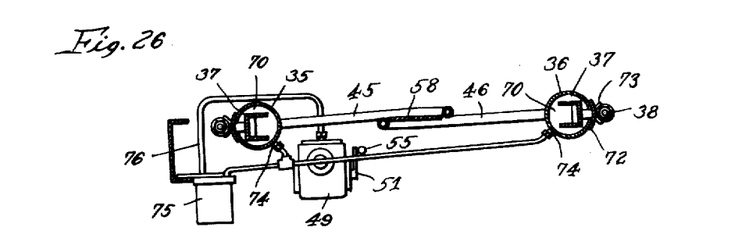
Fig. 26 is a sectional view taken approximately on the line 26—26 of Fig. 3, showing the connections between the retrieving chamber, the working cylinders, and the pump unit.
Figure 27:
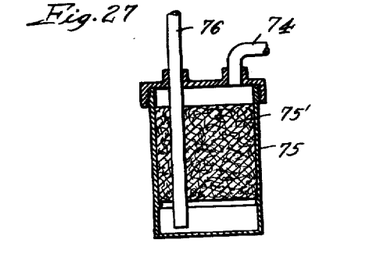
Fig. 27 is an enlarged sectional view of the retrieving chamber.

The cylinders 35 and 36 have the fluid filled chambers in the opposite ends thereof, as indicated at 69 in Fig. 5. The space 70 between these chambers is at atmospheric pressure and contains no fluid except what little is apt to leak past the two-way cup leathers 71 on the opposite ends of the piston 37. The oil collected in atmospheric chambers 70 will not be contaminated, because the shields 72 cover the slots 39 in the side walls of the cylinders. These shields are arched to conform to the outside of the cylinders and slide with a close working fit thereon in the movement of the pistons. Lugs 73 are struck outwardly from the centers of these shields, as indicated in Figs. 2, 3 and 26, and are suitably secured to the side of the extensions 38 on the pistons, these extensions being entered through the holes provided in the shields where the lugs are formed. In accordance with my invention, I provide drain pipes 74 communicating with the bottom of the chambers 70 at a 45° angle, as shown at Fig. 26, whereby to drain off only the surplus leakage fluid and leave a small amount at all times to provide lubrication for the pistons and help to maintain a better seal between the pistons and the cylinder walls than would be obtained if the walls were permitted to become dry. The pipes 74 communicate with a collecting or retrieving chamber 75 to which the leakage fluid flows by gravity and wherein the fluid is filtered by passage through the material 75'. A pipe 76 communicating with the bottom of the chamber 75 serves to conduct the fluid filtered and collected therein to the pump unit 49 in which there is a sump 77 (Figs. 11 and 12) for the oil or other working fluid. The oil level is maintained below the armture shaft 78 of the electric motor 53. 79 is the filler hole which is kept sealed by a plug 80 (Fig. 14). The shaft 78 is coupled, as at 81, to the drive shaft 82 of the pump 52. The latter may be of any suitable or preferred type and has its suction side communicating with the sump 77 through a passage 83 provided in the wall of the pump unit 49. A cover 84 seals the pump unit and hence the sump chamber. Now, the pump 52 is of a predetermined capacity and is arranged to draw oil from the sump 77 so that a suction is created in the sump chamber. In that way the oil collected in the retrieving chamber 75 finds its way back into the hydraulic system, it being conducted through the pipe 76 to the sump 77. There is therefore no danger of the apparatus failing to function, by reason of sufficient working fluid. The fluid level in the pump unit 49 should not show any serious drop in a long time, inasmuch as the principal leakage will occur at the pistons 37, and that leakage is returned to the system. At any rate, if additional fluid is required it can be supplied from time to time through the hole closed by plug 80.

Figure 13:
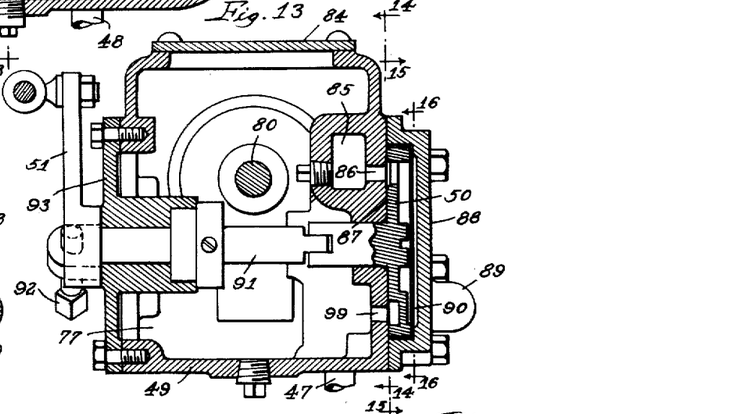
Figures 16, 18:
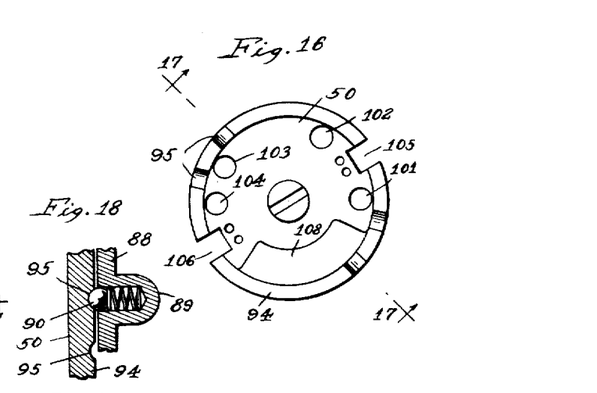
Fig. 18 is a sectional detail on the line 18—18 of Fig. 17.
Figure 17:
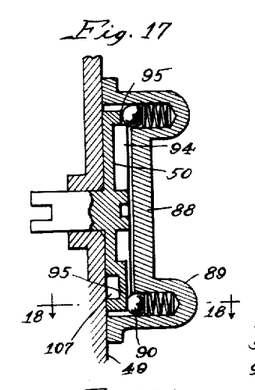
Fig. 17 is a sectional detail through the valve casing showing the valve and associated parts as viewed on the line 17—17 of Fig. 16.

The discharge or pressure side of the pump 52 communicates through a cored passage 85 provided in the wall of the pump unit 49 with a pressure port 86 arranged to communicate with the control valve 50 of the apparatus. The latter is of a rotary disk type and works on a flat seat 87 provided directly on the outside wall of the pump unit. A cover plate 88, suitably bolted in place, encloses the valve 50 and has diametrically opposed bosses 89 thereon containing spring-pressed ball detents 90 by means of which the valve 50 is always kept seated under spring pressure, and is furthermore arranged to be quickly releasably locked in either of the two intermediate positions; that is to say, in the "neutral" and "stabilizing" positions of the hand lever 54 (see Fig. 10). In the two limit positions, the lever 51 which turns the valve 50 by means of the shaft 91 comes into abutment with adjustable set screws 92 carried on the closure plate 93 on which the shaft 91 and lever 51 are assembled, as indicated in Figs. 10 and 13. The balls 90 ride on an annular upstanding rim 94 provided on the periphery of the valve 50, and when the valve is turned to either of the two intermediate positions mentioned, these balls drop into shallow arcuate recesses 95 provided therefor in the rim 94 (see Figs. 17 and 18). The driver in moving the hand lever 54 can tell by "feel" when the ball detents drop into these recesses, and knows therefore definitely when the valve 50 has been turned far enough. There is, however, in addition, suitable lettering or captions adjacent the slot in the index plate 96 through which the lever 54 projects, as indicated in Fig. 6, where L stands for left, S stands for stabilizing, N for neutral, and R for right. If desired, the detents may be provided directly in connection with the lever 54 and index plate 96, instead of having them cooperating with the valve 50.

Figures 19A, 19B, 19C:
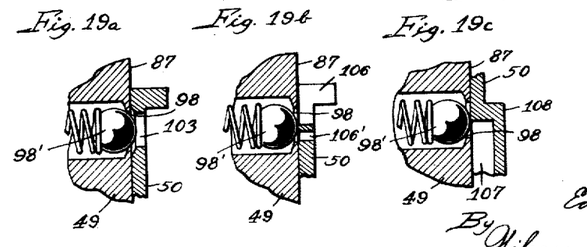
Figs. 19a—19c are sections on the line 19—19 of Fig. 14, showing the check valve in three different positions of the valve, as indicated by the lines a—a, b—b and c—c, respectively, in Figs. 20, 22 and 23.

A rather simple arrangement of ports in the valve 50 and seat 87 makes possible the four circuits shown in Figs. 20 to 23, which were previously briefly described. In the seat 87 there are, in addition to the pressure port 86, two diametrically opposed ports 97 and 98 communicating through cored passages provided in the wall of the pump unit 49 with the conduits 47 and 48, respectively. The ports 97 and 98 are both 90° removed from port 86. Approximately diametrically opposed from the port 86 are two spaced exhaust ports 99 and 100 communicating with the sump 77. The valve 50 has four ports 101–104 extending therethrough near the periphery thereof at the proper radius for registration with the ports 86, 97 and 98. In addition to this, there are two diametrically opposed notches 105 and 106 in the periphery arranged to register with the ports 97 and 98. The small holes 105' and 106' drilled through the valve adjacent the notches 105 and 106, respectively, serve to increase fluid flow through the ports registering with the notches. An arcuate channel 107 is provided in the boss 108 adjacent the periphery of the valve and is arranged to communicate with the ports 97, 98, 99 and 100, two at a time in different positions of the valve, as shown in Figs. 20 to 23. Now, there are outwardly seating spring-pressed ball check valves 97' and 98' tending to seal the ports 97 and 98, respectively, as shown in Fig. 19a, except when these balls are forcibly held unseated, as shown in Figs. 19b and 19c. These ball check valves prevent return flow of fluid when the pump 52 is stopped when the car has been leveled, thus keeping the car body in its angular relation to the axles so long as the driver desires. The valves can be unseated by simply moving the hand lever 54 to either of the two intermediate positions and thereby shift the valve 50 correspondingly to either of the positions shown in Figs. 21 and 22.

The operation of the valve is as follows:

In right-hand leveling, as shown in Fig. 20, the fluid delivered under pressure from the pump 52 through port 86 flows through valve port 102 into the valve cover 88, thus placing fluid pressure on the back of the valve to help keep it seated. The only outlet for the fluid is through valve port 103 and registering port 98, and the fluid unseats the ball check valve 98' and flows through conduit 48 into the front end of cylinder 36. The check valve 98' will, of course, close the moment the pump 52 stops, because then there is a tendency for fluid to back up in the line 48 from the cylinder 36, in addition of course to the tendency of the spring of the valve itself to close it. The fluid exhausted from the front end of cylinder 35 through conduit 47 flows past the ball check valve 97' through the port 97 and into valve passage 107, the check valve 98' being held unseated by the valve 50 similarly as shown in Fig. 19c. The oil leaves the valve passage 107 by way of exhaust port 99 and thus is returned to the sump 77.

The check valve 98' remaining seated traps the fluid in the line 48 and cylinder 36 so that the vehicle body cannot return to its normal position. It is only when the valve 50 is turned by the operation of the hand lever 54 to one of the intermediate positions of the latter that the check valve 98' is unseated and allows return flow past the valve so that the vehicle body can return to normal position. In left-hand leveling, the check valve 97' performs in a similar manner, keeping the vehicle body leveled until the hand lever 54 is shifted to either of the two intermediate positions of the lever.

In left-hand leveling, as shown in Fig. 23, the oil delivered under pressure from the pump 52 through port 86 flows through valve port 103 into the valve cover 88, thereby helping to keep the valve properly seated under fluid pressure. Here the only outlet for the fluid is through valve port 102 and the registering port 97, and the fluid unseats the ball check valve 97' and flows into conduit 47 which conducts it to the front end of cylinder 35. The fluid exhausted through the front end of cylinder 36 through conduit 48 passes the unseated ball check valve 98' which is held unseated by the valve 50, as shown in Fig. 19c, and enters valve passage 107 from which it flows through exhaust port 100 into the sump 77.

In the stabilizing operation, as shown in Fig. 21, both of the check valves 97' and 98' remain seated, because the ports 101 and 104 in the valve register with the ports 97 and 98, respectively, thus permitting the check valves to close similarly as illustrated in Fig. 19a. In this position of the valve, the port 86 is closed and the pump 52 is idle, and since there can be no flow from either of the conduits 47 and 48 past the related check valves 97' and 98', it is clear that the cylinders 35 and 36 are completely cut off from communication with the pump 52 and its sump 77.

In the snubbing or shock absorbing operation, as shown in Fig. 22, the notches 105 and 106 in the valve 50 are in register with the ports 97 and 98, respectively, and both of the ball check valves 97' and 98' are held unseated by the valve 50 in the manner shown in Fig. 19b. Thus, fluid may flow in either direction through either of the ports 97 and 98, and since the notches 105 and 106 provide open communication between these aforementioned ports and the inside of the valve cover 88, fluid may flow from the port 97 to the port 98, or vice versa. The port 86 in this position of the valve 50 is kept closed, and, of course, the pump 52 is idle.

Figure 7:
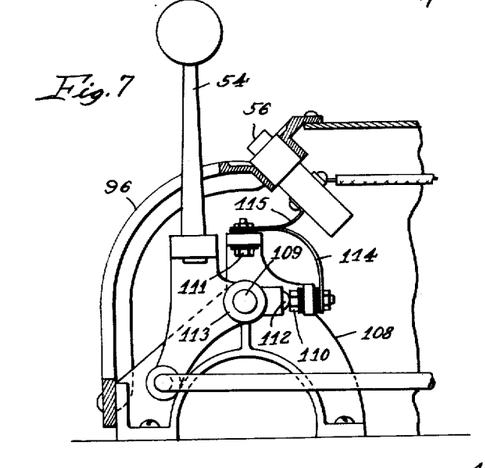
Fig. 7 is a cross-section on the line 7—7 of Fig. 6, on a larger scale.
Figure 8:
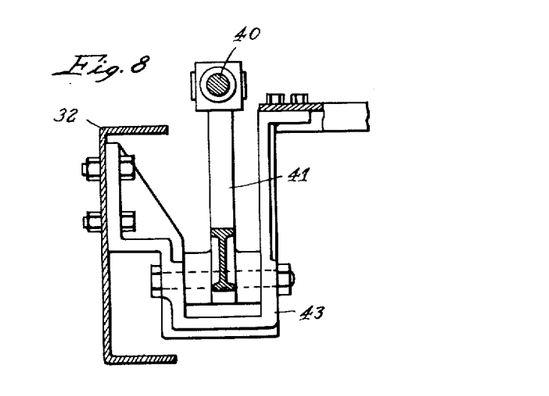
Fig. 8 is a sectional view on the line 8—8 of Fig. 4 of the left spring control lever.
Figure 9:
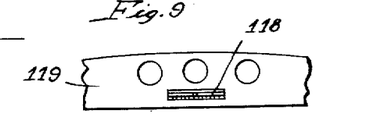
Fig. 9 is a diagrammatic illustration of the instrument board, showing a level indicating instrument thereon.

Referring now in particular to Figs. 7 and 10, it will be seen that the supporting yoke 108 fastened suitably to the floor of the vehicle and having the hand lever 54 pivoted thereto at 109, carries two insulated terminals 110 and 111 in circumferentially spaced relation relative to the pivot 109 approximately 90° apart arranged to be engaged by a spring-pressed ball 112 carried on the bearing portion 113 of the hand lever. Engagement of the ball 112 with these terminals occurs only when the hand lever is in the vertical position shown, for right-hand leveling, or in a horizontal position, for left-hand leveling. The terminals are connected together, as indicated at 114, and with the push button switch 56, as at 115. Thus when the hand lever 54 is in either of the two positions mentioned, one side of the switch 56 is grounded, as indicated in Fig. 10, and one may therefore operate the motor 53 to drive the pump 52 by simply depressing the button of the switch 56. That completes a circuit through the battery, indicated at 116 in Fig. 10, thereby energizing the solenoid of the relay switch 117 and causing it to close and complete a circuit through the motor 53. Assuming that there is no automatic cut-out switch in the motor circuit operated automatically, as hereinafter described, to break the circuit when the vehicle body is leveled, the driver will either rely upon his judgment as to when the car is leveled or there may be provided an ordinary spirit level or the like at a convenient point adjacent the driver's seat, as, for example, indicated at 118 in Fig. 9 on the instrument board 119. The driver simply watches the level 118 and keeps the button of the switch 56 depressed until the level indicates that the car has been leveled. It is obvious that since the switch 56 is not grounded unless the hand lever 54 is in either of its extreme positions for right or left hand leveling, the motor 53 cannot be operated by depression of the push button switch 56 when the lever 54 is in either of its two intermediate positions.

Figure 28:
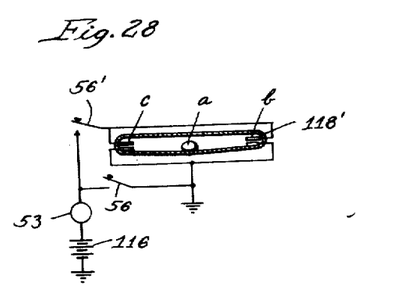
Fig. 28 is an electrical circuit diagram provided in a system where automatic or semi-automatic operation in leveling is desired.

Referring to Fig. 28, I have shown an electrical circuit for the motor 53 which will permit the purely manual control above described or semi-automatic control. In the manual control, the push button switch 56 can be depressed to operate the motor 53 as long as necessary. In semi-automatic control, another push button switch 56' is arranged to be depressed and kept depressed until the motor 53 is stopped automatically by an automatic mercury level switch 118'. In this switch 118', there is indicated a globule of mercury *a* arranged in a depression in the tube midway between two sets of contacts *b* and *c*. In right-hand leveling, for example, the globule *a* closes the circuit at *b* so long as the vehicle body has not been raised sufficiently on the right side and depressed sufficiently on the left side to cause the globule to roll away from the contacts *b* to the center of the tube. Hence the motor 53 will be operated automatically until the vehicle body is leveled.

It is believed the foregoing description conveys a good understanding of the objects and advantages of my invention. While I have disclosed a three-purpose apparatus, adapted for stabilizing, snubbing, and leveling, it should be understood that, since the three functions follow as a result of the three-position valve 50, it would be a simple matter to convert the present apparatus into one adapted for stabilizing and leveling only, or for snubbing and leveling only, or snubbing and stabilizing only, by simply eliminating one position of the valve and whatever part or parts required only in such position. Then, too, while the leveling feature is shown herein in combination, it may be used alone, that is, independent of stabilizing or snubbing means. The same is true of the stabilizing and snubbing features. The appended claims have been drawn with a view to covering all legitimate modifications and adaptations.

I claim:

1. In a vehicle, the combination of a wheeled structure, a frame, yielding suspension means supporting said frame on said wheeled structure so as to permit movement of said frame relative to said wheeled structure incident to travel of said vehicle, a frame elevating and depressing lever operatively connecting one side of said frame and said wheeled structure, a frame elevating and depressing lever operatively connecting the opposite side of said frame and said wheeled structure, each of said levers being adapted to depress the frame from a normal intermediate position or raise it from such position, said levers being normally relatively freely movable so as to permit the first mentioned movement of said frame, and operating means for simultaneously operating both of said levers in opposite directions, whereby to adjust the frame either way on its longitudinal axis to a desired angle from a normal intermediate position.

2. In a vehicle, the combination of a wheeled structure, a frame, yielding suspension means supporting said frame on said wheeled structure so as to permit movement of said frame relative to said wheeled structure incident to travel of said vehicle, a frame elevating and depressing lever operatively connecting one side of said frame and said wheeled structure, a frame elevating and depressing lever operatively connecting the opposite side of said frame and said wheeled structure, each of said levers being adapted to depress the frame from a normal intermediate position or raise it from such position, said levers being normally relatively freely movable so as to permit the first mentioned movement of said frame, an operating piston connected with each of said levers and reciprocable in a working cylinder, and pressure fluid means for simultaneously moving both of said pistons in opposite directions, whereby to adjust the frame either way on its longitudinal axis to a desired angle from a normal intermediate position.

3. In a vehicle, the combination of a wheeled structure, a frame, yielding suspension means supporting said frame on said wheeled structure so as to permit movement of said frame relative to said wheeled structure incident to travel of said vehicle, a frame elevating and depressing lever operatively connecting one side of said frame and said wheeled structure, a frame elevating and depressing lever operatively connecting the opposite side of said frame and said wheeled structure, each of said levers being adapted to depress the frame from a normal intermediate position or raise it from such position, said levers being normally relatively freely movable so as to permit the first mentioned movement of said frame, two piston and cylinder assemblies, one of the piston and cylinder elements of one assembly being connected to one of said levers and one of the piston and cylinder elements of the other assembly being connected to the other of said levers, and pressure fluid means for simultaneously moving the movable element of both assemblies in opposite directions, whereby to adjust the frame either way on its longitudinal axis to a desired angle from a normal intermediate position.

4. In a vehicle, the combination of a body, a wheel at each side of said body, a resilient supporting means between each of said wheels and said body, levers pivoted on each side of the body and operative to compress and expand the resilient means relative to one another so as to tilt the body laterally relative to the wheels in either direction, an operating piston connected with each of said levers and movable in a working cylinder, conduits interconnecting said cylinders so as to transmit a relative movement between the body and wheel on one side of the vehicle to an equal relative movement between the body and wheel on the opposite side of the vehicle, and pressure fluid means extraneous to the working cylinders and conduits and arranged to be connected therewith for communicating movement to one of said pistons in either direction and simultaneously move the other piston the same distance in the opposite direction.

5. In a vehicle, the combination of a body, a wheel at each side of said body, a resilient supporting means between each of said wheels and said body, levers pivoted on each side of the body and operative together in opposite directions to compress and expand the two resilient supporting means simultaneously relative to one another so as to tilt the body laterally relative to the wheels in either direction, an operating piston connected with each of said levers and movable in a working cylinder, conduits interconnecting said cylinders so as to transmit a relative movement between the body and wheel on one side of the vehicle to an equal relative movement between the body and wheel on the opposite side of the vehicle, a pump constituting a source of pressure fluid supply extraneous to the working cylinders and conduits, fluid conducting channels between said source and both cylinders for communicating movement to one of said pistons in either direction and simultaneously move the other piston the same distance in the opposite direction and including check valve means arranged to open to allow flow of fluid from the pump during its operation to the cylinders but arranged to close to prevent return flow when the pump stops, whereby to support the body in tilted position, and manually operable means for opening said check valve means.

6. In a vehicle comprising a frame and two opposed wheels supporting said frame and each carried on a spring permitting relative movement between the frame and wheel, apparatus for positively leveling the vehicle while standing at a curb or otherwise laterally inclined about its longitudinal axis, said apparatus comprising means including communicating hydraulic systems disposed at opposite sides of the frame and serving to transmit a relative movement between the frame and wheel on one side of the vehicle to an equivalent movement between the frame and wheel on the other side of the vehicle, means controlling communication between the systems so as to reverse the direction of transmission of relative movement between opposite sides of the vehicle, and hydraulic pressure fluid means arranged to be placed in communication with the systems through said controlling means in its direction reversing position to forcibly effect a desired positive jacking movement between the frame and wheel on either side of the vehicle and an opposite equivalent movement between the frame and wheel on the other side of the vehicle.

7. In a vehicle comprising a frame and two opposed wheels supporting said frame and each carried on a spring permitting relative movement between the frame and wheel, apparatus for positively leveling the vehicle while standing at a curb or otherwise laterally inclined about its longitudinal axis, said apparatus comprising means including communicating hydraulic systems disposed at opposite sides of the frame and connected to the frame and wheels so that relative movement between the frame and wheels can be produced by power impelled movement of the hydraulic fluid medium in the systems and so that relative movement between the frame and wheels in turn produces movement of said hydraulic fluid medium in the systems, and hydraulic pressure fluid means arranged to be placed in communication with said systems to produce power impelled positive jacking movement between the frame and wheels.

8. In a vehicle comprising a frame and two opposed wheels supporting said frame and each carried on a spring permitting relative movement between the frame and wheel, apparatus for positively leveling the vehicle while standing at a curb or otherwise laterally inclined about its longitudinal axis, said apparatus comprising means including communicating hydraulic systems disposed at opposite sides of the frame and connected to the frame and wheels so that relative movement between the frame and wheels can be produced by power impelled movement of the hydraulic fluid medium in the systems and so that relative movement between the frame and wheels in turn produces movement of said hydraulic fluid medium in the systems, hydraulic pressure fluid means arranged to be placed in communication with said systems to produce power impelled positive jacking movement between the frame and wheels, and means controlling communication between said hydraulic pressure fluid means and said systems whereby to cause an elevating movement between the frame and either wheel and a depressing movement between the frame and the other wheel.

9. In a vehicle having double-acting hydraulic fluid containing cylinders with pistons movable therein connected so as to move in the relative movement between the body of the vehicle and its wheels, means cross-connecting two cylinders on opposite sides of the vehicle so as to cause a sympathetic unidirectional movement of one piston when the other piston is actuated, fluid conduits connected to the corresponding ends of said cylinders, valve means connected with said conduits arranged to place the same into communication whereby said pistons are adapted to operate as described or operate individually substantially independently of each other, a power operable pump for delivering hydraulic fluid under pressure to either of said conduits and simultaneously withdrawing hydraulic fluid from the other for positively jacking up either side of the vehicle body relative to the wheels while positively depressing the other side simultaneously, check valve means for preventing return flow of fluid when the pump is stopped, whereby to lock the vehicle in an adjusted position produced by the power operation of the pistons, and manually operable means for opening the check valve means.

10. In a fluid control system of the character described comprising fluid conduits adapted to be connected to the ends of a pair of cross-connected working cylinders, valve means connected with said conduits, said valve means comprising relatively movable valve elements, a power-operable pump arranged to be placed in communication with said conduits through said valve means to deliver fluid under pressure to one of said conduits and exhaust fluid from the other, and a check valve in one of said valve elements arranged to open to permit flow of fluid under pressure from the pump to the conduit but prevent return flow when the pump is stopped, said check valve being arranged to be opened by relative movement between the valve elements, and means for operating said valve elements relative to one another.

11. In a fluid control system of the character described comprising fluid conduits adapted to be connected to the ends of a pair of cross-connected working cylinders, valve means connected with said conduits, said valve means comprising relatively movable valve elements, a power-operable pump arranged to be placed in communication with said conduits through said valve means to deliver fluid under pressure to either of said conduits and exhaust fluid from the other, and a plurality of check valves in one of said valve elements arranged to open to permit flow of fluid under pressure from the pump to the conduits but prevent return flow when the pump is stopped, said check valves being arranged to be opened by relative movement between the valve elements, and means for operating said valve elements relative to one another.

12. In a vehicle having double-acting hydraulic fluid type cylinders comprising cylinders with pistons movable therein upon relative movement between the vehicle body and its wheels, means cross-connecting two shock absorbers on opposite sides of the vehicle to cause the pistons to move in the same direction when one is moved, fluid conduits connected to the same end of each cylinder, a power operable pump for delivering hydraulic fluid under pressure to either one of said conduits and simultaneously withdrawing hydraulic fluid from the other, for positively jacking up either side of the vehicle while positively depressing the other side simultaneously, check valve means for preventing return flow of fluid when the pump is stopped, whereby to lock the vehicle in an adjusted position produced by the power operation of the shock absorbers, and means for opening the check valve means.

13. In a vehicle having double-acting hydraulic fluid type cylinders comprising cylinders with pistons movable therein upon relative movement between the vehicle body and its wheels, means cross-connecting two shock absorbers on opposite sides of the vehicle to cause the pistons to move in the same direction when one is moved, manually operable valve means controlling communication between corresponding ends of said shock absorbers whereby said shock absorbers are adapted either to operate independently of each other or jointly in the same direction, said valve means having two other positions for power impelled right and left hand vehicle leveling movement, respectively, of said shock absorbers by positive hydraulic jacking operation therewith, and a source of hydraulic pressure fluid supply arranged in the latter two positions of said valve means to deliver hydraulic fluid under pressure selectively to one end of either of said cylinders while hydraulic fluid is exhausted from the corresponding end of the other cylinder.

14. A hydraulic stabilizing and spring controlling and operating apparatus for vehicles in which the vehicle frame is connected with the wheels by means of springs, comprising two liquid containers each having opposed end chambers separated by means of a double-acting piston, each of said pistons being adapted to be moved by the compression and rebound movements of one of the vehicle springs, means including a three-position valve connecting the end chambers in each container or the end chambers in the two containers in two of the three positions of the valve, and a source of hydraulic pressure fluid supply arranged to deliver hydraulic fluid under pressure to the end chamber of one container and exhaust hydraulic fluid from the corresponding end chamber of the other container in a third position of said valve.

15. A hydraulic stabilizing and spring controlling and operating apparatus for vehicles in which the vehicle frame is connected with the wheels by means of springs, comprising two liquid containers each having opposed end chambers separated by means of a double-acting piston, each of said pistons being adapted to be moved by the compression and rebound movements of one of the vehicle springs, means including a four-position valve connecting the end chambers in each container or the end chambers in the two containers in two of the four positions of the valve, and a source of hydraulic pressure fluid supply arranged to deliver hydraulic fluid under pressure selectively to the end chamber of either container and exhaust hydraulic fluid from the corresponding end chamber of the other container in the other two positions of said valve.

16. In a fluid operated mechanism comprising two liquid containers each having opposed end chambers separated by means of a double-acting piston, the piston having oppositely facing spaced piston elements and the container being open at the middle thereof between the end chambers and between said piston elements, each of said said pistons being adapted to be connected with the mechanism to be operated through the middle opening, fluid conducting passages connected with the end chambers of said containers, a power operable pump communicating with said passages to deliver fluid under pressure to one container and exhaust fluid from the other container to effect power operation of the pistons therein, conduits for withdrawing leakage fluid from the middle portions of said containers, a drain receptacle communicating therewith, and a conduit communicating with the pump and extending to the drain receptacle to withdraw fluid therefrom.

17. A hydraulic spring controlling apparatus assembly adapted to be mounted on a vehicle, comprising two piston containing cylinders adapted for positioning on opposite sides of the vehicle, criss-crossed rigid pipes cross-connecting the ends of said cylinders to provide fluid communication besides mechanical connections, means securing said pipes together at the point of crossing, a cross-member secured to both cylinders at one end to complete a unitary cylinder assembly, means for rigidly detachably securing said assembly to the vehicle by the other ends of said cylinders, and means for detachably and flexibly securing said assembly to the vehicle frame by an extension from the cross-member intermediate the ends thereof, said pistons having lateral extensions projecting from the sides of said cylinders for connection with the springs of the vehicle.

18. A vehicle comprising in combination fluid type shock absorbers connected between the frame and axle of the vehicle normally to be operated by relative movement between said frame and axle to restrain such movement yieldingly, hydraulic pressure fluid means normally disconnected from said shock absorbers while the vehicle is in motion but arranged to be connected therewith when the vehicle is standing, said means being adapted to positively actuate said shock absorbers to effect a positive hydraulic jacking operation, and means controlling the admission of the pressure fluid to said shock absorbers so as to cause opposite operation thereof on opposite sides of the vehicle simultaneously, whereby one side is positively elevated simultaneously with the positive depression of the other side.

19. In a vehicle, the combination with the vehicle frame, the supporting axle therebeneath, and springs interposed between the axle and frame normally to cushion relative movement between the axle and frame, of a piston fixed to one of said frame and axle, a cylinder slidably receiving the piston and connected to the other of said frame and axle, said piston and cylinder being mounted so as to cause relative movement of the frame toward or away from the axle independently of said springs, the cylinder being filled with hydraulic fluid on opposite sides of the piston, and hydraulic pressure fluid means having communication with opposite ends of the cylinder and functioning to inject fluid into one end of the cylinder and simultaneously exhaust fluid from the other end, whereby positively to move the frame up or down relative to the axle independently of the springs and support the frame in adjusted position independently of the springs.

20. In a vehicle, the combination with the vehicle frame, the supporting axle therebeneath, and springs interposed between the axle and frame normally to cushion relative movement between the axle and frame, of a pair of pistons on opposite sides of the frame each connected to one of said frame and axle, a pair of cylinders slidably receiving said pistons and connected to the other of said frame and axle, said cylinders and pistons being mounted so as to cause relative movement between the frame and axle independently of said springs, said cylinders being filled with hydraulic fluid on opposite sides of the pistons, hydraulic pressure fluid means for injecting fluid into one end of the cylinders and simultaneously exhausting fluid from the opposite end whereby positively to move the frame relative to the axle independently of the springs and support the frame in adjusted position independently of the springs, and means controlling communication between said hydraulic pressure fluid means and said cylinders whereby to cause opposite relative movement between the frame and axle on opposite sides of the vehicle.

EDWARD RICHTER.

CERTIFICATE OF CORRECTION.

Patent No. 2,148,504. February 28, 1939.

EDWARD RICHTER.

It is hereby certified that error appears in the printed specification of the above numbered patent requiring correction as follows: Page 7, second column, line 73, and page 8, first column, line 18, claims 12 and 13 respectively, for the word "cylinders" first occurrence, read shock absorbers; same page 8, first column, lines 1 and 21, same claims 12 and 13, for "shock absorbers" read cylinders; and second column, line 7, claim 16, strike out "said"; line 26, claim 17, for "needs" read ends; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.

independently of the springs and support the frame in adjusted position independently of the springs.

20. In a vehicle, the combination with the vehicle frame, the supporting axle therebeneath, and springs interposed between the axle and frame normally to cushion relative movement between the axle and frame, of a pair of pistons on opposite sides of the frame each connected to one of said frame and axle, a pair of cylinders slidably receiving said pistons and connected to the other of said frame and axle, said cylinders and pistons being mounted so as to cause relative movement between the frame and axle independently of said springs, said cylinders being filled with hydraulic fluid on opposite sides of the pistons, hydraulic pressure fluid means for injecting fluid into one end of the cylinders and simultaneously exhausting fluid from the opposite end whereby positively to move the frame relative to the axle independently of the springs and support the frame in adjusted position independently of the springs, and means controlling communication between said hydraulic pressure fluid means and said cylinders whereby to cause opposite relative movement between the frame and axle on opposite sides of the vehicle.

EDWARD RICHTER.

CERTIFICATE OF CORRECTION.

Patent No. 2,148,504. February 28, 1939.

EDWARD RICHTER.

It is hereby certified that error appears in the printed specification of the above numbered patent requiring correction as follows: Page 7, second column, line 73, and page 8, first column, line 18, claims 12 and 13 respectively, for the word "cylinders" first occurrence, read shock absorbers; same page 8, first column, lines 1 and 21, same claims 12 and 13, for "shock absorbers" read cylinders; and second column, line 7, claim 16, strike out "said"; line 26, claim 17, for "needs" read ends; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.